J. L. TURNER.
PLATFORM.
APPLICATION FILED JUNE 27, 1921.
1,409,800.
Patented Mar. 14, 1922.
2 SHEETS—SHEET 1.
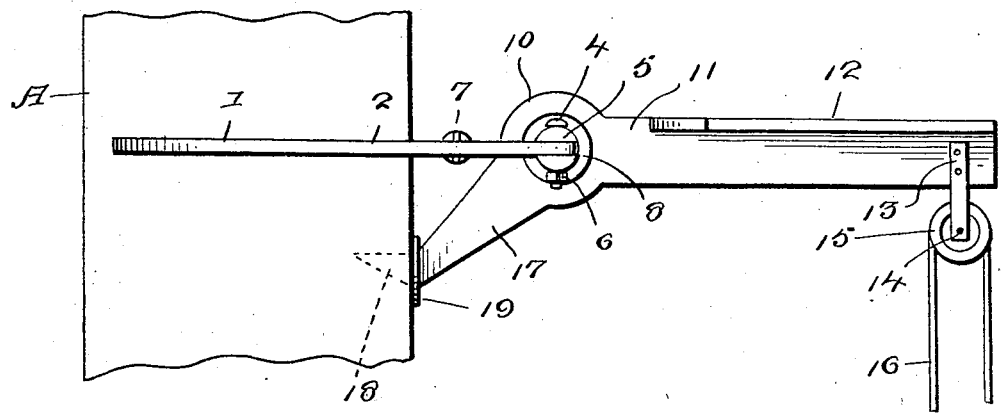
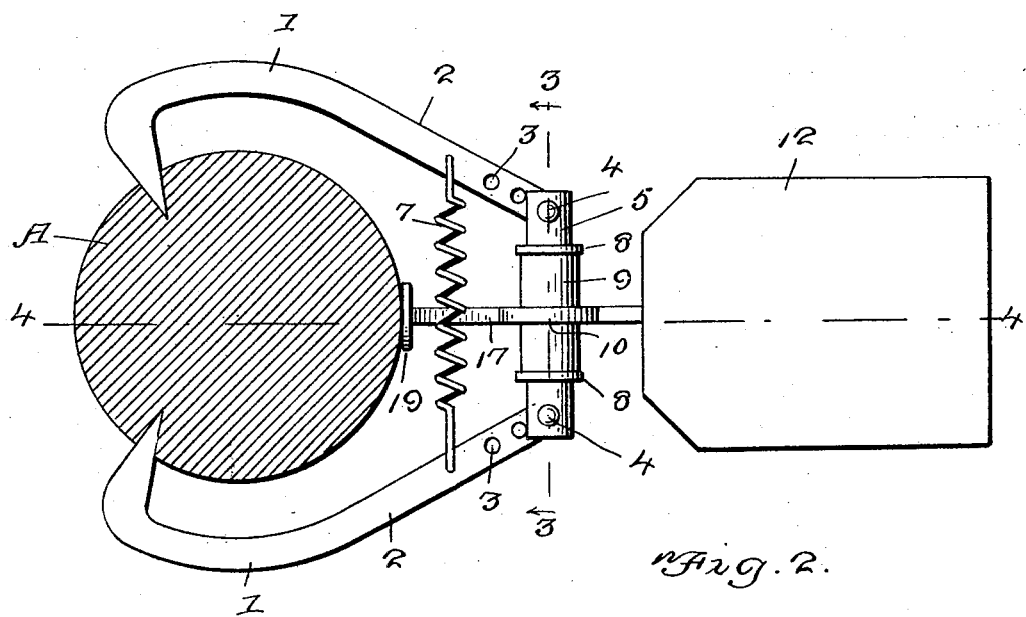
J. L. Turner
INVENTOR
BY Victor J. Evans
ATTORNEY

UNITED STATES PATENT OFFICE.

JAMES L. TURNER, OF SANFORD, NORTH CAROLINA.

PLATFORM.

1,409,800.  Specification of Letters Patent.  Patented Mar. 14, 1922.

Application filed June 27, 1921. Serial No. 480,776.

*To all whom it may concern:*

Be it known that I, JAMES L. TURNER, a citizen of the United States, residing at Sanford, in the county of Lee and State of North Carolina, have invented new and useful Improvements in Platforms, of which the following is a specification.

My present invention has reference to a platform designed to provide a support on a telegraph or like pole for linemen when affixing or repairing wires on the pole.

My object is to produce a platform or support of this character which shall be light in weight so that the same can be easily elevated by the linemen in climbing a pole in the usual manner, and thereafter readily arranged on the pole at a desired elevation, the improvement being of such nature that the weight imposed thereon will serve to bring the device into more efficient engagement with the post, and thereafter permit the lineman to accomplish his work when supported on the platform in a more easy and efficient manner, and with perfect safety.

A still further object is to produce a detachable support designed to be arranged on a telegraph or similar pole at desired elevations, in which grab hooks are provided for entering the sides of the pole, spring means influencing the grab hooks to pole engaging position, a swinging member or lever being pivotally connected between the grab hooks having an inner angle end which terminates in a dog and its opposite end supporting thereon a platform the weight of the latter, combined with the weight of the platform, swinging the lever and causing the dog to enter the pole right angularly with respect to the entering or impinging ends of the grab hooks, while on the outer end of the lever there is a sheave wheel around which a rope is trained whereby articles from the ground may be elevated to the workman on the platform.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 illustrates the application of the improvement on a telegraph or telephone pole.

Figure 2 is a horizontal sectional view through the pole directly above the improvement.

Figure 3:
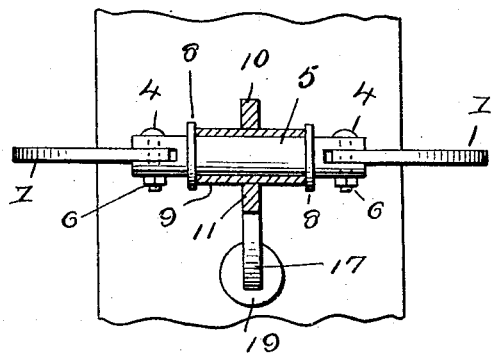
Figure 3 is a sectional view on the line 3—3 of Figure 2.
Figure 4:
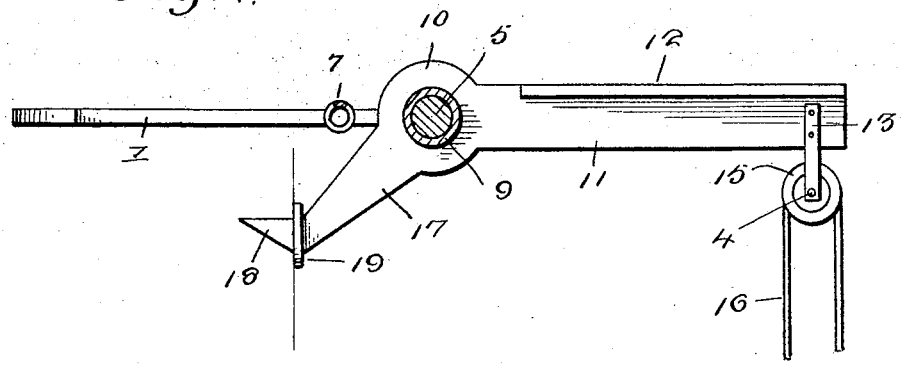
Figure 4 is a sectional view on the line 4—4 of Figure 2.
Figure 5:
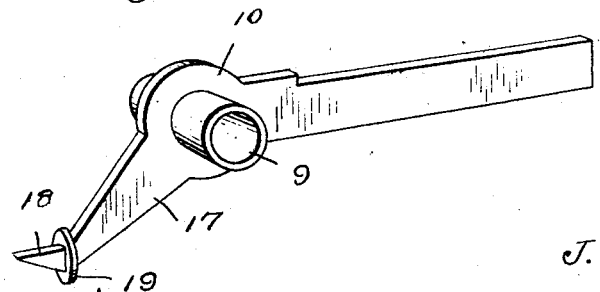
Figure 5 is a perspective view of the improvement, the shelf or platform being removed.

Referring now to the drawings in detail, the numeral 1 designates a pole for telephone or telegraph wires which is designed to be clamped, in the usual manner, by a lineman for attaching, detaching, splicing or repairing wires either on or adjacent to the cross heads carried by the pole. In order to provide an effective and safe support to the lineman in accomplishing his work I provide a device for supporting the said lineman in a safe and efficient manner. The device is of a comparatively light, but strong nature, lightness being desirable, inasmuch as the improvement is to be elevated by the lineman in arranging the same at predetermined elevations on the pole, and strength being essential for rendering the device compatible for withstanding the strain to which it is subjected and for providing a safe support for the workman.

In carrying out my invention, I make use of two oppositely disposed grab hooks which are indicated by the numeral 1. The shanks 2, of the grab hooks are inwardly inclined, and are provided, adjacent their outer ends with a series of spaced apertures 3. Passing through aligning apertures in the shanks of the respective grab hooks are removable pivots 4. The pivots pass through the bifurcated ends of a cross sectionally rounded member which is in the nature of an axle 5. The pivots 4 are preferably in the nature of bolts and have their threaded ends engaged by nuts 6, while attached to the shanks or arms 2 of the grab hooks 1 forwardly of the shaft 5, are the ends of a helical spring 7 that has a tendency to force the hooks toward each other, and consequently permit of the pointed ends of the said hooks readily entering the pole at the sides thereof, and to one side of the center thereof.

On the shaft 5 there is a pair of spaced collars or washers 8, and also on the shaft between the said collars or washers, which really provide contact elements, is a sleeve 9. Journaled on the sleeve 9 is the eye portion 10 of a lever 11. The lever, at its upper edge, and to the rear of the eye is formed with a depression that receives therein and has bolted or otherwise secured thereto a platform 12. The outer end of the lever, below the platform has secured on its sides depending straps 13, whose lower ends are connected by a shaft 14 on which is journaled a sheave wheel 15 and around this sheave wheel there is trained a cable 16. One end of the cable may be provided with a suitable hook or the like, the other strand providing the pull portion of the cable, and whereby material or tools can be elevated to the lineman who occupies the platform.

The lever 11, forward of its eye is provided with a downwardly extending portion 17 which terminates in an outwardly extended pointed dog 18, a shield plate 19 being provided between the extension 17 and the dog. It will be apparent that when the lever 11 is swung downwardly on the shaft 5 the pointed dog 18 will be forced into the pole 1, at the center thereof, and right angularly with respect to the entering points of the grab hooks 1. It will be further apparent that the greater the pressure upon the platform 12 the more effectively the pointed dog 18 will be driven into the post, the entrance of said dog in the post being limited by the shield or stop plate 19.

All of the elements constituting the improvement are removably associated and replaceable should injury occur to any one of the parts. The construction is simple and may be cheaply manufactured and marketed. As stated, the device is light, but is strong and efficient. The grab hooks 1, through the medium of their adjustable association with the shaft 5 have their pointed ends adjustable with respect to each other. The springs 7 materially assist the operator in causing the pointed ends of the grab hooks to be inserted in the posts, such insertions being primarily accomplished by subjecting the outer rounded ends of the hooks to the force of impact of a hammer or the like, the spring thereafter effectively holding the hooks in impinged condition, the weight imparted on the platform, as previously stated, driving the pointed dog 18 into the pole, while the arrangement of the flexible element or rod 16 on the device permits of an attendant on the ground raising to the lineman all material required in his work and consequently obviates the necessity of the lineman descending the pole to obtain such material.

Having described the invention, I claim:—

In a support designed to be attached to a pole or the like, grab hooks arranged in cooperating pair having inwardly extending shanks formed with spaced apertures, a shaft having its ends pivotally secured in certain of said apertures, a spring connecting the hooks forward of the shaft, whereby to bring the pointed ends thereof more effectively into the sides of the post, after said hooks have been partly forced into the said sides of the post, a sleeve journaled on the shaft, means holding the same against longitudinal movement, a lever having an eye portion journaled on the sleeve, a downwardly projected forwardly inclined front portion terminating in a pointed dog, a shield plate between the said extension of the lever and the dog, and said dog designed to be forced into the pole at the portion thereof to the rear and centrally with respect to the engaging ends of the grab hook, said lever having the portion thereof disposed outwardly of its eye notched, a removable platform received in the notch, a sheave wheel supported from the rear end of the lever, and a cable trained around said sheave wheel.

In testimony whereof I affix my signature.

JAMES L. TURNER.